United States Patent Office 3,840,449
Patented Oct. 8, 1974

3,840,449
NOVEL METHOD OF PRODUCING TWO-COMPONENT AND MULTI-COMPONENT COPOLYMERS CONTAINING CONJUGATED DIENE COMPOUNDS AND CONJUGATED POLAR VINYL MONOMERS USING PHOTO POLYMERIZATION
Junji Furukawa, Kyoto, and Eiichi Kobayashi and Yutaka Iseda, Uji, and Toshio Yukuta, Tokyo, Japan, assignors to Bridgestone Tire Company Limited, Tokyo, Japan
Filed Dec. 11, 1969, Ser. No. 884,249
Claims priority, application Japan, Dec. 13, 1968, 43/90,951; Oct. 19, 1969, 44/83,401, 44/83,402, 44/83,403
Int. Cl. C08d 1/00; C08f 1/16
U.S. Cl. 204—159.24                              16 Claims

ABSTRACT OF THE DISCLOSURE

Alternating copolymers having a composition, wherein the ratio of the total sum of the monomer (A) units to the total sum of the monomer (B) units is always substantially 1:1 (molar ratio), are produced by irradiating a light having a wave length of 2,000–6,000 angstroms to a polymerization reaction system composed of at least one monomer (A), selected from the group consisting of monomer (A) (1) of conjugated diene compounds and monomer (A) (2) of ethylenically unsaturated hydrocarbons and vinyl-substituted aromatic hydrocarbons, said monomer (A) always containing monomer (A) (1) as an essential component; and at least one monomer (B), selected from conjugated polar vinyl compounds, at a temperature of $-100-+100°$ C. The alternating property of the copolymer and copolymerization activity are improved by irradiating the light to the polymerization system in the presence of a catalytic component (a) of metal halides. This copolymerization activity can be more improved by using a photosensitizer (b) of aromatic hydrocarbon together with the catalytic component (a). Furthermore, the polymerization rate and the degree of polymerization can be controlled and the gel formation can be prevented by using a transition metal compound (c) together with the catalytic component (a).

---

The present invention relates to a novel method of producing two-component and multi-component copolymers containing conjugated diene compounds and conjugated polar vinyl monomers by using light, more particularly a method of producing alternating copolymers of particularly selected conjugated dienes and acrylonitrile, methacrylonitrile or $\alpha,\beta$-unsaturated carboxylates or multi-component alternating copolymers containing other monomers in addition to these monomers.

The term "alternating copolymers" used herein means copolymers having such a structure that an electron donor monomer unit and an electron acceptor monomer unit are arranged substantially altenately.

Recently, conjugated diene/conjugated polar vinyl compound copolymers have become commercially important as rubber having high oil resistance and weather resistance. The method of producing these copolymers is a radical polymerization process, in which a free radical initiator is used to obtain random copolymers.

Recently, it has been proposed in U.S. Patent Application No. 740,343, now abandoned that previously unknown butadiene/acrylonitrile stereo-specific alternating copolymers in which butadiene unit is substantially bonded only by trans-1,4 bond by using an organoaluminum halide can be produced. However, this process has a demerit that it is necessary to use a large amount of organoaluminum compound which is very dangerous in the handling, because such a compound ignites as soon as it contacts with air or water.

Thereafter, it has been proposed in U.S. Patent Application No. 740,342, now abandoned that a large amount of alternating copolymers can be produced by using a small amount of catalyst system in which a transition metal compound is combined to an organoaluminum halide.

It has been found that the thus obtained alternating copolymers have excellent properties which have never been claimed by any previously known random copolymers. This has been disclosed in the 17th Annual Meeting of the Society of Polymer Science, Japan in Tokyo (1968) (Furukawa, Iseda, Haga, Kataoka, Yoshimoto and Imamura). For example, in view of the properties of the vulcanized rubbers hardness and modulus are lower but tensile strength and elongation are larger and impact strength is higher than those of conventional NBR having a very high nitrile content. Furthermore, the swelling property in oil resistance is substantially same as but the tensile strength in oil resistance is larger and the heat resistance is more excellent than those of the conventional NBR having a high nitrile content. It has been found by X-ray that the alternating copolymers cause orientation-crystallization in the stretching as in the case of natural rubber and it has been ascertained that these copolymers have a property capable of being reinforced by carbon even in unvulcanized condition and these facts are very interesting.

Accordingly, the alternating NBR is relatively flexible and is high in the strength and excellent in the kinetic property and further has a high oil resistance, so that such a NBR is expected in development in new application.

The inventors have continued investigations with respect to such a kind of polymerization reaction system by using light and it has been found that two-component or multi-component alternating copolymers having such a composition that the ratio of the total sum of electron donor monomer (conjugated dienes, ethylenically unsaturated hydrocarbons and vinyl-substituted aromatic hydrocarbons) unit to the total sum of electron acceptor monomer (acrylonitrile, methacrylonitrile and $\alpha,\beta$-unsaturated carboxylates) unit is always substantially 1:1 (molar ratio), can be produced by irradiating light to the polymerization reaction system in the absence of the catalytic component.

Furthermore, it has been found that the polymerization activity can be improved by irradiation of light in the coexistence of Lewis acid type metal halides such as aluminum halide and zinc halide as a catalytic component as compared with the thermal polymerization, that the polymerization activity can be considerably improved by using benzene, naphthalene, phenanthrene, anthracene and xanthone series hydrocarbons as a photosensitizer together with the above catalytic component, and that the degree of polymerization and the polymerization rate can be controlled and the gel formation can be prevented by using compounds of transition metals of the Groups $V_B$, $VI_B$, and VIII together with the above catalytic component in the photopolymerization. As the result, the present invention has been accomplished.

The first aspect of the present invention consists in the following.

(1) A polymerization reaction system composed of electron donor monomers and acceptor monomers is irradiated with light to produce two-component or multi-component alternating copolymers (hereinafter abridged as alternating copolymers). It has hitherto been commonly known that a conjugated diene and a conjugated polar vinyl compound do not react by merely mixing at room temperature, and when their mixture is heated to high temperature, a Diels-Adler reaction proceeds at high rate to form co-dimers. However, it has been found that when light is irradiated to a mixture of electron donor monomers and acceptor monomers, a copolymer having a composition, wherein the ratio of the total sum of donor monomer unit to the total sum of acceptor monomer unit is always substantially 1:1, can be obtained.

The second aspect of the invention consists in the following.

(2) When light is irradiated to the said copolymerization system in the coexistence of the Lewis acid type metal halides as a catalytic component, the polymerization activity is improved as compared with the case where only light is used, and an alternating copolymer having more improved alternating property can be obtained. N. G. Gaylord and A. Takahashi reported a method of producing alternating copolymers of a conjugated diene and a conjugated polar vinyl compound by reacting the conjugated diene and the conjugated polar vinyl compound at high temperature by using zinc halide catalyst or a combination catalyst of zinc halide and an organic peroxide (155th ACS National Meeting at San Francisco (March and April, 1968), Division of Industrial and Engineering Chemistry, 69). However, T. Inukai et al. reported that in a reaction mixture of a conjugated diene and a conjugated polar vinyl compound obtained in the coexistence of Lewis acids, such as aluminum halide and zinc halide, the Diels-Adler reaction is considerably accelerated, and the Diels-Adler adduct is formed quantitatively in a very short time, but the copolymer is not formed (T. Inukai, M. Kasai, J. Org. Chem., 30, 3567 (1965); T. Inukai, T. Kojima, ibid, 31, 1121, 2032 (1966); ibid, 32, 869 (1967)). That is, the fact that alternating copolymers of a conjugated diene and a conjugated polar vinyl compound, wherein the conjugated diene unit is bonded in trans-1,4 type, can be obtained efficiently by irradiating light in the coexistence of the metal halide as a catalyst system, cannot be easily anticipated from the conventional method. As shown in the following Example 12, comparison of photopolymerization and thermal polymerization of butadient and acrylonitrile in the presence of aluminum tribromide surprisingly shows that in the photopolymerization the polymerization activity is improved and the copolymers can be obtained in a very high conversion, as shown in a polymerization time-conversion curve in FIG. 3. Furthermore, the copolymerization curve (FIG. 4) in the copolymer obtained by the photopolymerization shows that the copolymer has a high alternating property, which coincides with that in the thermal polymerization as shown in Example 13.

Moreover, as shown in Example 24, the copolymerization by irradiation of light produces rapidly the alternating copolymer having a high degree of polymerization, while if the irradiation of light is effected only at the initial stage of the polymerization reaction and the initiation reaction is confirmed and then a dark polymerization is carried out for a long period of time, the polymerization does not proceed during the dark polymerization. From this fact it is considered that light is effective not only for the generation of radical, but also for the activation of monomer and light is effective even in the growth stage of polymerization. This is also a surprising fact.

The third aspect of the invention consists in the following.

(3) The polymerization activity is considerably improved by using the aromatic hydrocarbons as a photosensitizer in the light irradiation process in the presence of the metal halide. W. L. Dilling et al. have reported that when butadiene and α-acetoxyacrylonitrile are dimerized in the excited state by irradiation of ultraviolet ray, the proportion of cyclobutane derivatives in the reaction product is higher than that of cyclohexene derivatives as compared with the case when they are reacted in the absence of light, and that the value of the lowest triplet state energy of the photosensitizer to be used influences the yield of cyclobutane derivatives (W. L. Dilling, J. C. Little, J. Amer. Chem. Soc. 89, 2741 (1967); ibid, 89, 2742 (1967)). That is, with proper selection of photosensitizer butadiene is liable to become triplet state having trans-1,4 structure in the photo-existed state by ultraviolet ray irradiation, and therefore the proportion of cyclobutane derivatives in the dimerized product of butadiene and α-acetoxyacrylonitrile becomes higher. However, the present invention is novel in that alternating copolymers of a conjugated diene and a conjugated polar vinyl monomer, in which butadiene unit is bonded in trans-1,4 type, can be can be produced in a considerably improved activity and in a high yield by irradiating light in the presence of the photosensitizers.

The fourth aspect of the present invention consists in the following.

(4) The degree of polymerization and the polymerization rate can be controlled and the gel formation can be prevented by coexisting transition metal compound in the process of irradiating light in the presence of the metal halide. In the process of irradiating light in the presence of the metal halide, the polymerization rate is often too fast to be controlled, and gel may be formed. When the transition metal compound coexists in such polymerization system, the polymerization rate and the degree of polymerization can be optionally controlled and moreover the gel formation in the resulting copolymer can be prevented. These facts have not hitherto been known and are surprisingly discovered by the present invention.

The invention will be explained in more detail.

The first aspect of this invention consists in a method of producing copolymers having a composition, wherein the ratio of the total sum of the above monomer (A) units to the total sum of the above monomer (B) units is always substantially 1:1 (molar ratio), which comprises irradiating a light having a wave length of 2,000–6,000 angstroms to a polymerization reaction system composed of at least one monomer (A), in liquid state selected from the group consisting of monomer (A) (1) of conjugated diene compounds having the general formula wherein $R^1$, $R^2$, $R^3$ and $R^4$ represent hydrogen atoms, hydrocarbon radicals having 1 to 5 carbon atoms or hydrocarbon radicals having substituents of these radicals, and monomer (A) (2) of ethylenically unsaturated hydrocarbons and vinyl-substituted aromatic hydrocarbons having the general formula wherein $R^5$ and $R^6$ represent hydrogen atoms, hydrocarbon radicals having 1 to 10 carbon atoms or hydrocarbon radicals having substituents of these radicals, said monomer (A) always containing the monomer (A) (1) as an essential component; and at least one monomer (B) in liquid state selected from the group consisting of conjugated polar vinyl compounds having the general formula wherein $R^7$ represets a hydrogen atom; a hydrocarbon radical having 1 to 10 carbon atoms or a hydrocarbon radical having substituents of the radical, Z represents a nitrile group or an ester group having the general formula wherein $R^8$ represents a hydrocarbon radical having 1 to 10 carbon atoms, at a temperature of −100−+100° C.

The second aspect of the invention consists in a method of producing the alternating copolymers, wherein a light having a wave length of 2,000–6,000 angstroms is irradiated to a polymerization reaction system composed of the monomer (A) and the monomer (B) at a temperature of —100—+100° C. in the presence of at least one catalytic component (a), selected from the group consisting of metal halides having the general formulae $$ZnX_2 \text{ and } AlX_3$$

wherein X represents a halogen atom.

The third aspect of the invention consists in a method of producing the alternating copolymers, wherein the light is irradiated to the polymerization system in the presence of a catalyst system prepared by complexing the catalytic component (a) with a part of the monomer (B) or with at least one basic organic compound selected from the group consisting of organic nitriles, benzoates, $\alpha,\beta$-unsaturated carboxylates and phenyl alkyl tertiary amines.

The fourth aspect of the invention consists in a method of producing the alternating copolymers, wherein the light is irradiated to the polymerization reaction system in the presence of the catalytic component (a) and in the presence of at least one photosensitizer (b), selected from the group consisting of benzene series aromatic hydrocarbons (b) (1), in which benzene is a basic nucleus and the benzene nucleus has at least one substituent selected from the group consisting of hydrogen, hydrocarbon radicals having 1 to 10 carbon atoms and hydrocarbon radicals having substituents of these radicals, and polynucleus aromatic compounds (b) (2), in which naphthalene, phenanthrene, anthracene and xanthone are basic nuclei and these basic nuclei have at least one substituent selected from the group consisting of hydrogen, hydrocarbon radicals having 1 to 10 carbon atoms and hydrocarbon radicals having substituents of these radicals.

The fifth aspect of the invention consists in a method of producing the alternating copolymers, wherein the light is irradiated to the polymerization reaction system in the presence of the catalytic component (a) and at least one transition metal compound (c) selected from compounds of transition metals of the Group $V_B$, $VI_B$ and VIII in the Periodic Table, which have at least one halogen, alkoxy or $\beta$-diketo group.

In order to obtain alternating copolymers of the present invention, the above monomer (A) (1) is essential and monomers (A) and (B) must be combined. Furthermore, not only one monomer each, selected from monomers (A) and (B) respectively be combined, but also two or more monomers of (A) and (B) respectively may be combined. In this case, multi-component alternating copolymer, wherein the monomer (A) and the monomer (B) are bonded alternately, can be obtained, independent of the kind of the monomers selected.

The conjugated diene compounds to be used as the monomer (A) (1) in the present invention include butadiene-1,3, isoprene, pentadiene-1,3, hexadiene-1,3, 2,3-dimethylbutadiene-1,3, phenylbutadiene-1,3, diphenylbutadiene, etc. Among them, butadiene-1,3 and isoprene are preferable, and butadiene-1,3 is most preferable.

The ethylenically unsaturated hydrocarbons to be used as the monomer (A) (2) include propylene, isobutylene, buten-1, etc. The vinyl-substituted aromatic hydrocarbons to be used as the monomer (A) (2) include styrene, 1-vinylnaphthalene, 3-vinyltoluene, divinylbenzene, 3,5-diethylstyrene, $\alpha$-methylstyrene, etc. Among these (A) (2) monomers, styrene, isobutylene, propylene are preferable.

The monomers (A) are electron donor monomers having a small $e$ value, particularly, a negative $e$ value in the monomer reactivity index $Q-e$ defined by Price and Alfrey.

The conjugated polar vinyl compound to be used as the monomer (B) include acrylonitrile, methacrylonitrile, methyl acrylate, ethyl acrylate, propyl acrylate, butyl acrylate, methyl methacrylate, ethyl methacrylate, etc. Among them, acrylonitrile, methyl acrylate, methyl methacrylate are preferable, and acrylonitrile is most preferable.

The monomers (B) are electron acceptor monomers having a large $e$ value, particularly, a positive $e$ value in the monomer reactivity index $Q-e$ defined by Price and Alfrey.

As combinations of monomers (A) and (B) to be used for the production of the two-component alternating copolymers of the present invention, mention may be made of butadiene/acrylonitrile, butadiene/methacrylonitrile, butadiene/methyl acrylate, butadiene/methyl methacrylate, pentadiene/acrylonitrile, pentadiene/ethyl acrylate, isoprene/acrylonitrile, isoprene/butyl acrylate, isoprene/methyl methacrylate, isoprene/methyl acrylate, hexadiene/acrylonitrile, etc. Among them, preferable combinations are butadiene/acrylonitrile, butadiene/methyl methacrylate, isoprene/acrylonitrile, isoprene/methyl methacrylate, isoprene/methyl acrylate and pentadiene/acrylonitrile, etc., and a most preferable combination is butadiene/acrylonitrile.

As combinations of monomers selected from monomers (A) and (B) to be used for the production of the multi-component alternating copolymers, mention may be made of butadiene/acrylonitrile/methyl acrylate, butadiene/acrylonitrile/butyl acrylate, butadiene/isoprene/acrylonitrile, butadiene/isobutylene/acrylonitrile, butadiene/styrene/acrylonitrile, butadiene/styrene/methyl methacrylate, butadiene/styrene/isobutylene/acrylonitrile, etc. Among them, a preferable combination is butadiene/styrene/methyl methacrylate.

The catalytic components (a) to be used in the invention include zinc chloride, zinc bromide, aluminum trichloride, aluminum tribromide, etc.

The basic organic compounds to be used for forming complexes of the catalytic component (a) include organic nitriles, benzoates, $\alpha,\beta$-unsaturated carboxylates, phenyl alkyl tertiary amines, which contain nitrile, ester group or nitrogen having lone pair in the molecule. Examples of these basic organic compounds are acrylonitrile, fumaronitrile, methacrylonitrile, acetonitrile, propionitrile, benzonitrile, methyl acrylate, methyl methacrylate, ethyl benzoate, dimethylaniline, etc. Among them, acrylonitrile, acetonitrile, methyl methacrylate, dimethylaniline and ethyl benzoate are preferable.

The benzene series aromatic hydrocarbons to be used as a photosensitizer (b) (1) in the invention include benzene, ethylbenzene, cumene, cymene, etc. The polynucleus aromatic hydrocarbons to be used as a photosensitizer (b) (2) includes naphthalene, $\alpha$-methylnaphthalene, phenanthrene, anthracene, xanthone, etc. Among these compounds, cymene, naphthalene and xanthone are preferably used as a photosensitizer (b).

The transition metal compounds (c) to be used in the present invention include compounds of transition metals of the Groups $V_B$, $VI_B$ and VIII in the Periodic Table, which have at least one member of halogen, alkoxy or $\beta$-diketo group. Among them, vanadium, chromium, iron and cobalt compounds soluble in the polymerization reaction system are preferable. Particularly, vanadium compounds having halogen or $\beta$-diketo group are preferable. Examples of these transition metal compounds are vanadyl trichloride, vanadyl diacetylacetonate, vanadyl dibutoxide, chromyl chloride, chromyl acetylacetonate, iron trichloride, iron acetylacetonate, salicylaldehyde cobalt, cobalt acetylacetonate. Among them, vanadyl trichloride, vanadyl butoxide, cobalt triacetylacetonate, iron triacetylacetonate, chromyl chloride are preferable.

In the present invention, light having a wave length of 2,000–6,000 A. is generally used. Particularly, ultraviolet ray having a wave length of 2,000–4,000 A. is preferably used. The light source is not particularly limited, and any of mercury lamp, sodium lamp, xenon lamp and sun light can be used through a proper filter. Means for irradiating light to the polymerization reaction system is not particularly limited. The light may be irradiated to the polymerization reaction system kept in a stationary state or in a stirred state by rotation and the like.

In the present invention, means for feeding the monomers is optional. The monomer feed ratio influences the yield, the degree of polymerization and the physical properties of the resulting polymer, so that the monomer feed ratio can be properly determined depending upon the purpose.

The molar ratio of the monomer (A) to the monomer (B) to be used for the production of the alternating copolymer is usually within the range of 20/1–1/20, preferably 8/1–1/8. However, in a copolymerization effected only by the irradiation of light, the combination that the molar ratio of the monomer (A) to the monomer (B) is within the ratio of 1/1–1/9, will give alternating copolymers having a composition, wherein the ratio of the total sum of the monomer (A) units to the total sum of the monomer (B) units is always substantially 1:1 (molar ratio).

In the production of multi-component alternating copolymers, the molar ratio of the monomer (A) of conjugated diene compound and ethylenically unsaturated hydrocarbon or vinyl-substituted aromatic hydrocarbon to the monomer (B) of conjugated polar vinyl compound can be determined optionally depending upon the purpose. However, the ratio of the total sum of the electron donor monomer (A) units to the total sum of the electron acceptor monomer (B) units in the copolymers does not essentially vary and is always 1:1 (molar ratio).

An amount of the catalytic component (a) to be used in the present invention can be selected optionally depending upon the purpose. The amount influences the yield and the degree of polymerization of the resulting copolymer and the gel formation, but does not influence the composition and structure of the resulting copolymer. The catalytic component (a) is generally used in an amount not exceeding the amount of the conjugated polar vinyl compound to be used as a monomer (B), and the amount is within the range of $1/10^6$–$1/2$ mole per 1 mole of total fed monomer. More specifically, the amount of the component (a) is sufficient in an amount less than $1/10$ mole per 1 mole of the conjugated polar vinyl compound to be used as a monomer (B).

Complexes of the catalytic component (a) with the basic organic compounds can be prepared in optional means.

An amount of the photosensitizer (b) to be used is usually within the range of $1/10^{10}$–$1/4$ mole per 1 mole of total fed monomer and $1/10$–$1/2$ mole per 1 mole of the catalytic component (a). However, among the photosensitizer (b) (1), liquid compounds at the polymerization temperature can be used as a solvent for the polymerization system.

An amount of the transition metal compound (c) to be used is sufficient usually in a very small amount and is within the range of $1/10^{10}$–$1/4$ mole per 1 mole of total fed monomer and $1/10^4$–$1/2$ mole per 1 mole of the catalytic component (a). However, the amount is not particularly limited and can be determined optionally depending upon the purpose.

In the present invention, the above-mentioned catalytic components (a), photosensitizers (b) and transition metal compounds (c) and monomers (A) and (B) can be mixed in an optional order. They are usually mixed at a temperature of −78−+30° C., but the temperature is not limited thereto. In the method of the present invention, it is preferable to prepare a polymerization system and to carry out a polymerization reaction in the following order, that is, the catalytic component (a) is mixed with a conjugated polar vinyl compound of the monomer (B), and the resulting mixture is added to the photosensitizer (b) or the transition metal compound (c), and added to the monomer (A) in this order, and then light is irradiated to the resulting polymerization system. When a catalyst system in which the catalytic component (a) is complexed with the basic organic compound is used, variation of the yield of alternating copolymer due to the addition order can be decreased. For example, in the case of a photocopolymerization of butadiene and acrylonitrile, even when aluminum tribromide complexed with acetonitrile as a catalytic component (a) is added to butadiene and acrylonitrile is added thereto, followed by irradiation to the resulting mixture, an alternating copolymer can be obtained in a high yield. On the contrary, if aluminum tribromide not complexed is added, a cationic polymerization of butadiene immediately occurs even in the same addition order, and the yield of an alternating copolymer decreases.

The polymerization temperature can be selected optionally within the range of −100−+100° C., but the temperature range is usually −80−+80° C., preferably −30−+40° C.

The copolymerization reaction is carried out under a pressure from one determined by vapor pressure in the copolymerization system to 150 atm., but this polymerization pressure is not limitative.

The copolymerization reaction is carried out under an atmosphere which does not prevent the copolymerization reaction, for example, vapor of the monomer, nitrogen gas or argon gas.

The copolymerization reaction can substantially be carried out by a bulk polymerization in liquid monomer without the use of a solvent. For example, the copolymerization reaction can be preferably carried out in a system, wherein a large amount of a conjugated polar vinyl compound of the monomer (B) is used. Further, the copolymerization reaction can be carried out in an inert solvent which does not prevent the reaction. Among the photosensitizers (b) (1), liquid compounds at the polymerization temperature can be also used as a solvent.

As the inert solvents, mention may be made of aliphatic hydrocarbons, alicyclic hydrocarbons and halogenated hydrocarbons, for example, propane, butane, pentane, hexane, cyclohexane, dichloromethane, chloroform, tetrachloromethane, tetrachloroethane, etc.

After the completion of the copolymerization reaction, the after-treatment is carried out by conventional method to purify and recover the copolymer. These methods include alcohol treating, alcoholhydrochloric acid treating, hydrochloric acid-water treating, etc. For example, the copolymerization solution, after N-phenyl-β-naphthylamine is added as an antioxidant, is poured into a large amount of methanol-hydrochloric acid to dissolve unreacted monomers and residue of catalysts, or poured into a hot water to evaporate unreacted monomers and to dissolve residue of catalysts, whereby the resulting copolymer is separated out, and then the copolymer is dried under vacuum at 50° C.

The copolymers obtained by the method of the present invention have various properties according to the combination of monomers, the monomer feed ratio, the polymerization temperature, the polymerization time and other conditions. However, the structure of the alternating copolymer, wherein the conjugated diene unit is bonded in a high trans-1,4 type and both monomer units (A) and (B) are bonded alternately, does not vary. For example, when butadiene is used as a monomer (A), the trans-1,4 bond in the butadiene unit of the resulting copolymer determined by Morero's method is more than 95%.

The composition, microstructure and arrangement of both monomer units (A) and (B) in the resulting copolymers are confirmed by solubility, infrared absorption spectrum (hereinafter abridged as IR spectrum), nuclear magnetic resonance spectrum (hereinafter abridged as NMR spectrum), elemental analysis, composition analysis of the copolymers obtained by varying the monomer feed ratio, stress-strain curve of the resulting copolymers, pyrolysis gas chromatography and the like.

With respect to these points, an explanation will be made by exemplifying butadiene/acrylonitrile copolymer.

For a better understanding of the invention, reference is taken to the accompanying drawings, wherein.

(a) SOLUBILITY

The acrylonitrile/butadiene copolymer obtained by the present invention is soluble in dichloromethane, chloroform, dimethylformamide, tetrahydrofuran, acetonitrile, benzonitrile, acrylonitrile, methyl ethyl ketone, nitrobenzene, dioxane, acetone, dimethyl sulfoxide, aniline, nitropropane, ethyl acetate, and the like but insoluble in hexane, heptane, benzene and toluene.

This shows that said copolymer is considerably different from polyacrylonitrile insoluble in acetonitrile, acrylonitrile, tetrahydrofuran, chloroform, dioxane and acetone and polybutadiene insoluble in dioxane, acetone, acetonitrile. Furthermore, it can be seen that the copolymer does not contain homopolymer and has a structure, which is considerably different from that of each homopolymer.

(b) IR SPECTRUM

The butadiene/acrylonitrile copolymer obtained by the present invention was dissolved in tetrahydrofuran, and the resulting solution was formed into a copolymer film on a rock salt plate and then IR spectrum of the copolymer film was measured. The characteristic absorption band of nitrile group in acrylonitrile unit and the characteristic absorption band of trans-1,4 bond in butadiene unit were distinctly observed at 2,240 cm.$^{-1}$ and 970 cm.$^{-1}$ respectively, but the characteristic absorption bands of (—C=N—) bond in acrylonitrile unit and cris-1,4 bond in butadiene unit were not observed, and that of 1,2-bond in butadiene unit was very small. Besides, when the microstructure of butadiene unit in the copolymer was analyzed by means of a method described in Chim. e. Ind., *41*, 758 (1959) by Morero et al., trans-1,4 bond was 98%, 1,2-bond 2% and cis-1,4 bond to 0%. The copolymers produced by the different polymerization conditions gave always the same IR spectrum.

The method of the present invention always provides butadiene/acrylonitrile copolymer connected butadiene in trans-1,4 type of more than 95%.

The composition ratio of both the monomer units in the copolymer can also be analyzed from IR spectrum. For example, when as the characteristic absorption bands of acrylonitrile unit and butadiene unit are selected 2,240 cm.$^{-1}$ and 970 cm.$^{-1}$ respectively and the ratio of absorbance of these absorption bands is measured, if the composition of the copolymer is constant, the ratio of the absorbance is constant, so that said ratio indicaes the composition of the copolymer. By this method, it was found that the copolymers obtained by the present invention have always the same composition. Moreover, it was confirmed from elemental analysis and NMR spectrum that the composition ratio of both the monomer units is substantially 1:1 (molar ratio).

(c) NMR SPECTRUM

Various acrylonitrile/butadiene copolymers obtained by the present method were dissolved in deuterochloroform and measured at 60 mc./sec. with respect to NMR spectrum to always obtain the same spectrum. In each NMR spectrum, the chemical shift of each proton assigned to butadiene unit and acrylonitrile unit was observed. Furthermore, it was found that said chemical shift is entirely different from the chemical shifts of polybutadiene, polyacrylonitrile and block bond of butadiene unit. In the chemical shift of the butadiene/ acrylonitrile copolymer obtained by the present invention, the chemical shift assigned to butadiene unit was observed in $\tau=4.43$ and 7.70 and the chemical shift assigned to acrylonitrile unit was observed in $\tau=$about 7.35 and 8.27 and the other chemical shifts were not observed. While, the copolymer produced by emulsion polymerization using a conventional free radical initiator was measured with respect to NMR spectrum. The NMR spectra of the copolymer of the invention and the copolymer produced by the emulsion polymerization were compared. In the NMR spectrum of the copolymer obtained by the emulsion polymerization, the chemical shifts owing to block bond were observed in addition to the chemical shifts observed in the copolymer of the invention. For example, the methine proton in butadiene unit was observed as a shoulder at $\tau=$about 4.6 and the methylene proton in butadiene unit was observed as an additional peak at $\tau=7.87$. These addition peaks were increased in random copolymer containing 60 mol percent of butadiene unit. From this it was found that the chemical shifts in $\tau=$about 4.6 and 7.87 are due to the block bond of two or more of butadiene units. This fact shows that in the butadiene/acrylonitrile copolymer obtained by the present invention, both the monomer units are bonded substantially alternately.

The composition ratio of both the monomer units in the copolymer can be calculated from an area ratio of resonance spectrum of each proton in NMR spectrum.

It was confirmed with the copolymer having a well-known composition ratio that this means is correct. For example, the composition ratio of the copolymer can be calculated from the ratio of the integral value of the spectrum of methine proton in butadiene unit to the integral value of the spectra of methine proton and methylene proton in acrylonitrile unit and methylene proton in butadiene unit. When the composition of the copolymer obtained by the present invention was analyzed by this means, it was found that even if the composition of fed monomers is varied, the composition of the resulting copolymers does not vary always and the molar ratio of both the monomer units is 1:1.

(d) ELEMENTAL ANALYSIS

As a method of copolymerizing butadiene with acrylonitrile, the use of a free radical initiator has been known. In this copolymerization reaction, the composition of the copolymer is determined by a probability limited by monomer feed ratio, the monomer reactivity ratio and the like.

Therefore, in the same combination of monomers, the composition of the copolymer generally is varied by changing the monomer feed ratio. Accordingly, the distinction of an alternating copolymer of the present invention and a random copolymer obtained by using a free radical initiator can be attained by observing the variation of the composition of the copolymer corresponding to the variation of the fed monomers.

The composition of the cpolymer can be measured by an elemental analysis of the copolymer. By this method, it has been found that the composition of the copolymer obtained by the present invention has no relation to the theoretical value of the free radical copolymer and has substantially always a constant composition. Furthermore, it has been supported that the composition is substantially always 1:1 and the resulting copolymer has an alternating copolymerization structure.

(e) PYROLYSIS

A method of quantifying monomers generated by pyrolysis with gas chromatography.

The butadiene/acrylonitrile copolymer obtained by the present invention was subjected to a pyrolysis at 500° C. and the proportion of the generated butadiene monomer and acrylonitrile monomer was measured and compared with the value in a random copolymer. As the result, the former, i.e., the copolymer obtained by the present invention, contains about 27% of acrylonitrile monomer, while the latter, i.e. the free radical copolymer was about 60%. Thus, the generated acrylonitrile monomer in the copolymers of the present invention is very small as compared with that in the free radical copolymer. This fact supports that the copolymer of the present invention has an alternating structure.

(f) STRESS-STRAIN CURVE

When the strain is small, the proportion of the stress variation is small, but when the strain is large, the proportion of the stress variation is large corresponding to the variation of the strain, so that the state of the rising of the curve is observed. From this, it can be seen that a rapid increase of strength is based on the orientation-crystallization of molecule by drawing. Such an orientation-crystallization has never been found in the known random copolymers. This phenomenon proves that the copolymer of the present invention has an excellently regular and alternating structure.

The copolymers obtained by the method according to the present invention have various properties according to the combination of monomers, the kind, composition and amount of the catalyst, the monomer feed ratio and the other polymerization condition. However, the structure of the alternating copolymers, wherein the conjugated diene unit is bonded in a high trans-1,4 type and the molar ratio of the total moles of donor electron monomer units to the total moles of electron acceptor monomer units is substantially 1:1, does not vary.

The bonding type of the conjugated diene in the resulting multi-component alternating copolymer and the composition of the copolymer can be confirmed by IR spectrum, elemental analysis and NMR spectrum of the copolymer obtained under various conditions. That is, it can be confirmed by IR spectrum that the conjugated diene unit is always bonded in a high trans-1,4 type and all kinds of monomer units are contained. It can be confirmed by elemental analysis that even when the monomer feed ratio is varied, the molar ratio of the total moles of electron donor monomer units to the total moles of electron acceptor monomer units is always substantially 1:1. From the chemical shift and the ratio of peak areas of NMR spectrum, it can be confirmed that the polymerization product is not a mixture, but a copolymer, and further the ratio of each monomer unit, that is, the composition of the copolymer can be confirmed.

As mentioned above, the butadiene/acrylonitrile copolymers obtained by the present invention are the alternating copolymers different from random and graft copolymers obtained by a conventional emulsion polymerization process using a known free radical initiator and have remarkable characteristics which have never been observed in these conventional random and graft copolymers. For example, the properties in the butadiene/acrylonitrile copolymer will be explained in detail hereinafter.

(1) The alternating copolymer had a lower glass transition temperature in uncured state than the conventional random copolymer having the same butadiene unit content. The impact resilience at 60° C. of the alternating copolymer in cured state was 160% of the random copolymer.

(2) Compounds were prepared according to the following recipe and then cured at 145° C. for 60 minutes.

|  | Parts |
|---|---|
| Copolymer | 100 |
| Carbon black SRF | 45 |
| Zinc white | 5 |
| Stearic acid | 1 |
| N-phenyl-β-naphthylamine | 1 |
| Accelerator NOBS sp. | 1 |
| Sulfur | 1.5 |

Next, physical properties of the conventional random copolymer and the alternating copolymer obtained by the present invention were measured in the cured state. The results are shown in the following Table.

|  | Alternating copolymer [1] | Random copolymer |
|---|---|---|
| (a) Original state: |  |  |
| Hardness (JIS) | 68 | 86 |
| 100% modulus (kg./cm.$^2$) | 38 | 105 |
| Tensile strength (kg./cm.$^2$) | 235 | 194 |
| Elongation (percent) | 410 | 210 |
| (b) Oil resistance: [2] |  |  |
| Swell (percent) | 112 | 112 |
| Tensile strength (kg./cm.$^2$) | 146 | 97 |
| Elongation (percent) | 310 | 150 |

[1] Intrinsic viscosity in dimethylformamide at 30° C. is 1.6.
[2] Oil=JIS "B," room temperature × 48 hours; "B"=isooctane/toluene (70/30).

As seen from this result, it can be seen that the alternating copolymer has smaller hardness and modulus and higher tensile strength, elongation and impact resilience than the random copolymer.

As described above it is apparent that the alternating copolymers of the present invention possess the characteristics which cannot be considered from the random copolymer and have desirable excellent properties to be used as rubber.

There are many applications in which these characteristics can be utilized and many of them are developed by the properties of the alternating copolymer which have not been possessed by the conventional random and graft copolymers. Moreover, multi-component alternating copolymers, in which the physical properties of the two-component alternating copolymers are improved, can be produced by properly selecting the kind and amount of the monomer (A) (2).

The two-component or multi-component alternating copolymers may be used as such and further may be converted to a material having a three-dimensional configuration by means of a cross linking agent.

They have wide utilizations, for example, they can be used for rubber materials to be used for petroleum transporting means in which oil resistance and strength are required, other oil-resistant rubber materials, strengthened rubber materials, plastic materials, adhesive, film, latex, paint, surface treating agent, etc.

The following examples are given in illustration of this invention and are not intended as limitations thereof.

Example 1

A hard glass reaction tube of 30 ml. capacity and 1 mm. thickness was dried and air in the reaction tube was replaced with gaseous nitrogen. Into the reaction tube was charged 15.8 ml. of purified acrylonitrile, cooled to −78° C. and further charged 2.0 ml. of purified liquid butadiene. Then the reaction tube was fused and sealed, immersed in a thermostat bath at 30° C. and then exposed to an ultraviolet ray by means of a high pressure mercury lamp of 300 w. at a distance of 4 cm. After exposed for 24 hours, the reaction tube was opened and added with a small amount of N-phenyl-β-naphthylamine. Then, the reaction mixture was poured into a large amount of methanol to precipitate a copolymer. This copolymer was completely dissolved in chloroform and had no gel content. The conversion was 0.672 g. and the appearance was tough and rubbery. The intrinsic viscosity of the copolymer in dimethylformamide at 30° C. was 4.12. It was confirmed from elemental analysis, NMR specrtum and IR spectrum that the resulting copolymer had an alternating structure.

Example 2

A photopolymerization reaction was effected in the same manner as described in Example 1, except that 12.3 ml. of acrylonitrile and 6.0 ml. of butadiene were charged, to obtain a copolymer of 0.448 g. having no gel content. The intrinsic viscosity was 4.75 and the acrylonitrile content was 49 mole percent.

Example 3

A photopolymerization reaction was effected in the same manner as described in Example 1, except that 8.8 ml. of acrylonitrile and 10.0 ml. of butadiene were charged, to obtain a tough and rubbery copolymer of 0.285 g. having no gel content. The intrinsic viscosity was 3.26.

Example 4

A photopolymerization reaction was effected in the same manner as described in Example 1, except that 5.3 ml. of acrylonitrile and 14.0 ml. of butadiene were charged, to obtain a rubbery copolymer of 0.153 g.

Example 5

A photopolymerization reaction was effected in the same manner as described in Example 1, except that 1.8 ml. of acrylonitrile and 18.0 ml. of butadiene were charged, to obtain a rubbery copolymer of 0.120 g.

Example 6

A photopolymerization reaction was effected in the same manner as described in Example 1, except that 22.6 ml. of methyl methacrylate and 2.0 ml. of butadiene were charged, to obtain a rigid and elastomeric copolymer of 0.513 g. This copolymer was soluble in chloroform and toluene. The intrinsic viscosity of the copolymer in toluene at 30° C. was 1.96.

Example 7

A photopolymerization reaction was effected in the same manner as described in Example 6, except that 17.5 ml. of methyl methacrylate and 6.0 ml. of butadiene were charged, to obtain a rigid and elastomeric copolymer of 6.01 g.

Example 8

A photopolymerization reaction was effected in the same manner as described in Example 6, except that 12.6 ml. of methyl methacrylate and 10.0 ml. of butadiene were charged, to obtain a rigid and elastomeric copolymer of 0.155 g.

Example 9

A photopolymerization reaction was effected in the same manner as described in Example 6, except that 7.6 ml. of methyl methacrylate and 14.0 ml. of butadiene were charged, to obtain a rigid and elastomeric copolymer of 0.096 g.

Example 10

A photopolymerization was effected at 30° C. for 24 hours while irradiating an ultraviolet ray in the same manner as described in Example 1, except that tetrachloromethane was used as a solvent and 150 mmoles of isoprene and 150 mmoles of acrylonitrile were charged, to obtain a resinous alternating copolymer in a conversion of 10%. It was found from elemental analysis that the acrylonitrile content of the copolymer was 52.1 mole percent. (A similar result was obtained when methyl acrylate was used instead of acrylonitrile.)

Example 11

A photopolymerization was effected at 30° C. for 48 hours while irradiating an ultraviolet ray in the same manner as described in Example 1, except that dichloromethane was used as a solvent and 100 mmoles each of butadiene, methyl methacrylate and styrene was charged, to obtain a resinous multi-component alternating copolymer in a conversion of 12%. It was found from elemental analysis that as the composition of the copolymer, the molar ratio of methyl methacrylate:butadiene:styrene was 47:36:17 and the ratio of electron acceptor monomer (methyl methacrylate) and electron donor monomer (butadiene and styrene) was 1:1. (The similar results were obtained even if hexane, toluene and chlorobenzene were used as a solvent.)

Example 12

Figure 1:
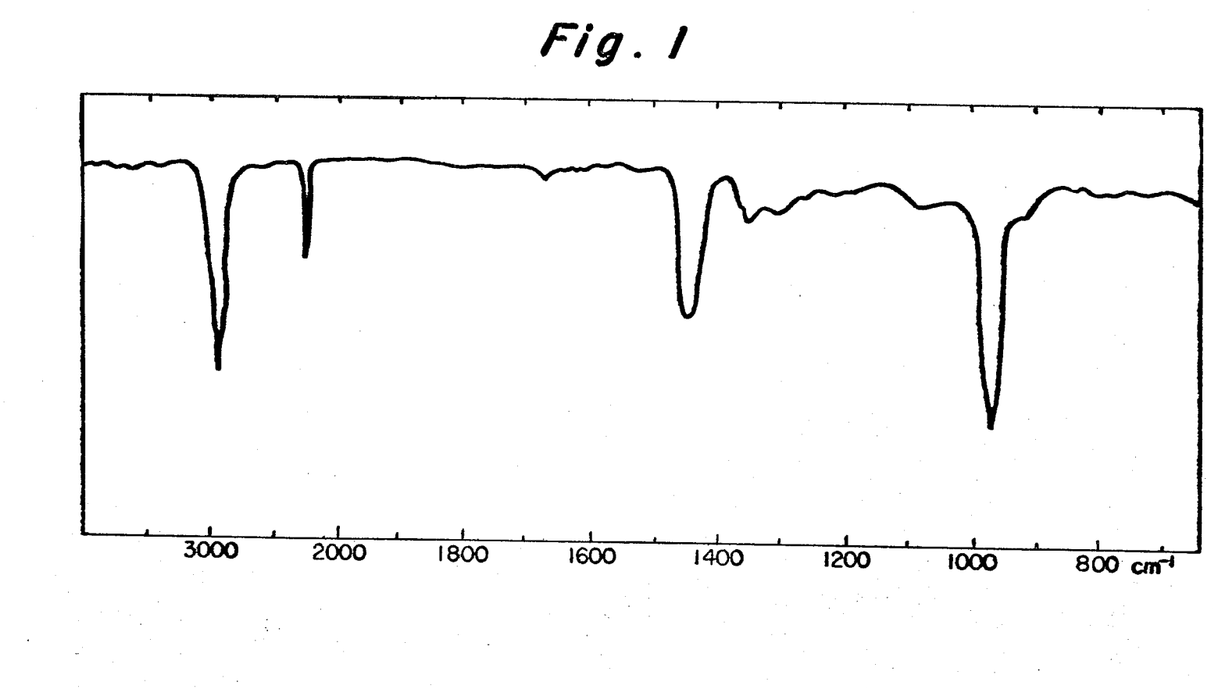
FIG. 1 shows an IR spectrum of butadiene/acrylonitrile copolymer in the following Example 14.
Figure 2:
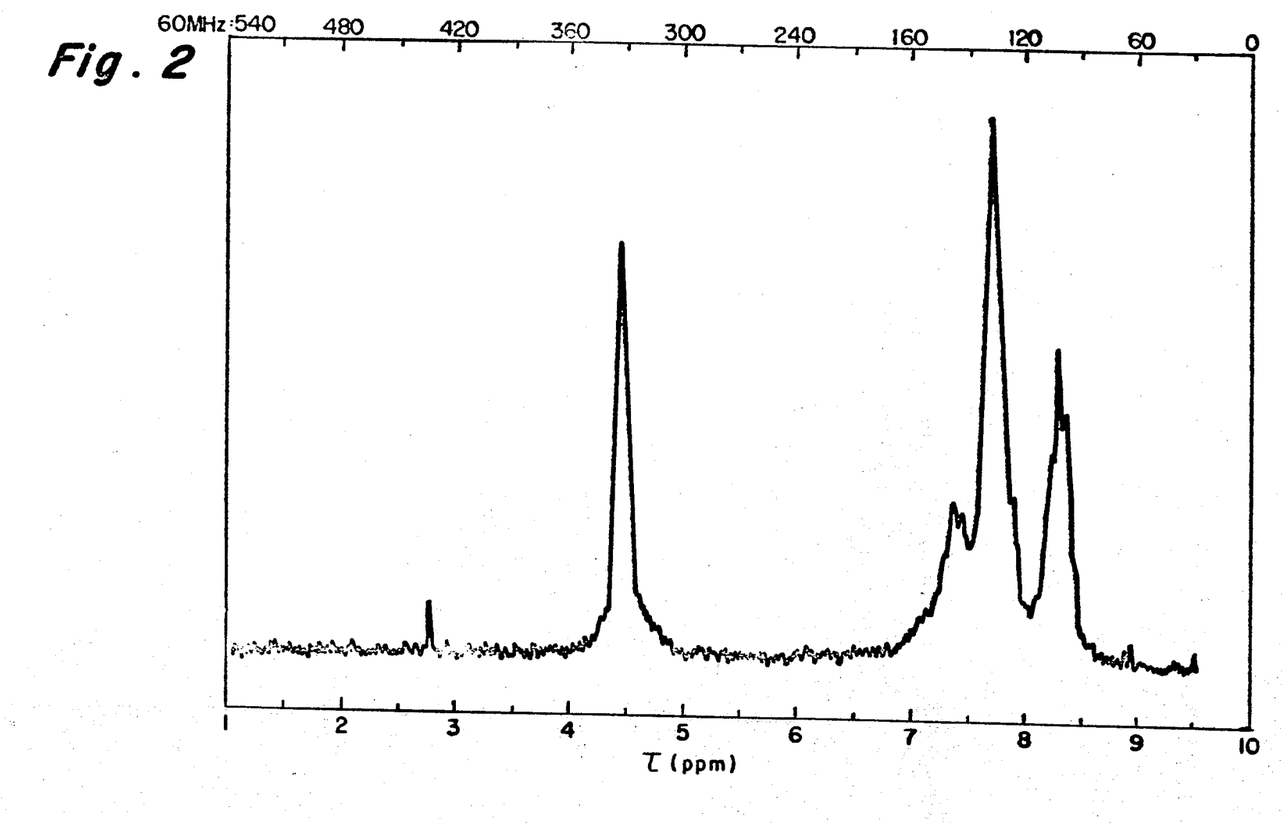
FIG. 2 shows a NMR spectrum of the same copolymer as in FIG. 1.
Figure 3:
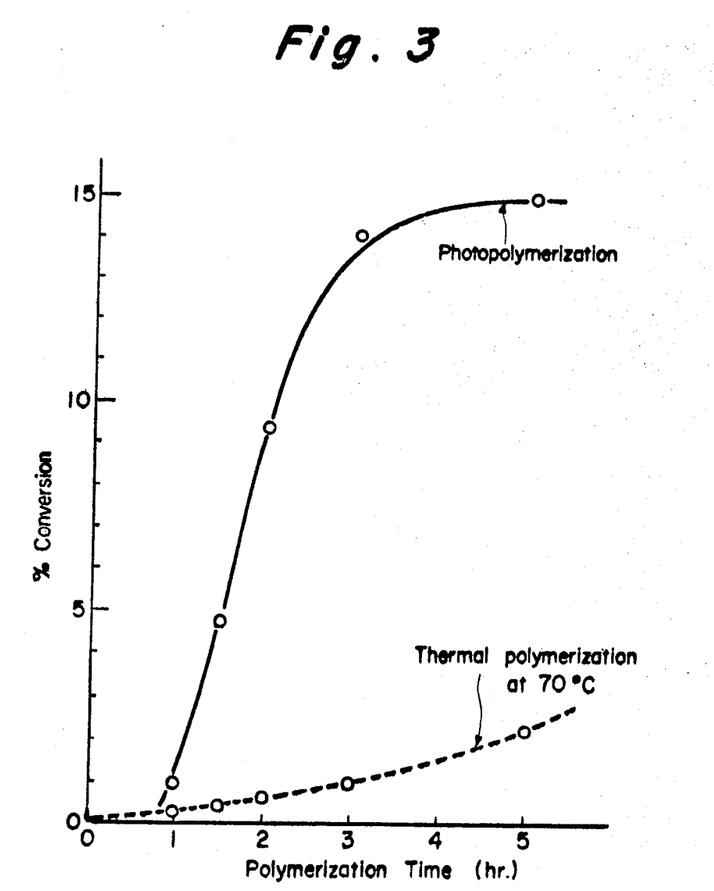
FIG. 3 is a curve showing a relation between polymerization time and conversion in the production of the butadiene/acrylonitrile copolymer in the following Example 12.

A Pyrex glass polymerization bottle of 100 ml. capacity and 4 mm. thickness was thoroughly dried and air in the bottle was replaced with gaseous nitrogen. Into the bottle were charged 776 mmoles of distilled acrylonitrile and a 1 mole/l. solution of 2 mmoles of anhydrous aluminum tribromide in toluene and the resulting solution was mixed at room temperature. Then, the mixed solution was cooled to −78° C. and added with 100 mmoles of purified liquid butadiene, after which the polymerization bottle was closed tightly. Thereafter, the polymerization bottle was exposed to an ultraviolet ray by means of a high pressure mercury lamp (100 w.) arranged in a water-cooling jacket at a distance of 2 cm. to effect polymerization. The polymerization temperature was 23–29° C. The polymerization reaction systems were exposed to said ultraviolet ray for 1, 1.5, 2, 3 and 5 hours, respectively, after which each polymerization bottle was opened and the reaction mass was mixed with about 250 ml. of methanol containing about 1% by weight of N-phenyl-β-naphthylamine as an antioxidant to precipitate a copolymer. The conversions of the resulting copolymers, after dried under vacuum, were 0.9, 4.7, 9.3, 14.0 and 14.9% based on the theoretical conversion in the assumption that only an alternating copolymer is obtained, respectively. When a thermal polymerization was effected at 70° C. without irradiating light under the same conditions as described above, the conversions were 0.2, 0.4, 0.6, 0.9 and 2.2%, respectively. The relation between polymerization time and conversion is shown in FIG. 3.

Example 13

A photopolymerization was effected in the same manner as described in Example 12, except that the total fed amount of butadiene and acrylonitrile was fixed to 200 mmoles, while the amount of acrylonitrile fed was varied to 21.88, 39.24, 56.60, 73.96 and 91.32 mole percent, and a 1 mole/l. solution of 2 mmoles of anhydrous aluminum bromide in acrylonitrile was used, to obtain a copolymer within the range of the conversion of not more than 2%. The resulting copolymers were rubbery elastomers, and were dissolved in chloroform and then reprecipitated with methanol repeatedly. Found values of nitrogen in these copolymers according to the elemental analysis were 12.83, 12.84, 12.78, 13.06 and 14.05%, respectively. These values corresponded to 49.08, 49.13, 48.89, 49.96 and 53.70 mole percent of the acrylonitrile contents in the copolymers, respectively.

When a thermal polymerization was effected at 60° C. without irradiating the light under the same condition as described above, found values of nitrogen were 12.72, 12.66, 12.83 and 13.32% in the obtained copolymers corresponding to the polymerization systems in which the amounts of acrylonitrile fed were 21.88, 39.24, 56.60 and 73.96 mole percent, respectively. These found values correspond to 48.67, 48.45, 49.07 and 50.96 mole percent of the acrylonitrile contents in the copolymers, respectively.

Figure 4:
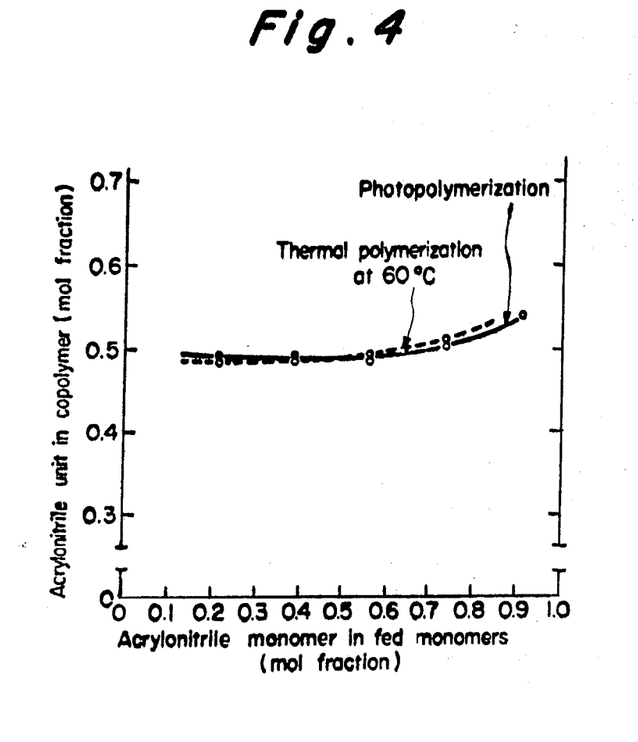
FIG. 4 is a curve showing a relation between mole fraction of acrylonitrile monomer in fed monomers and that of acrylonitrile unit in the resulting butadiene/acrylonitrile copolymer in the following Example 13.

Namely, it was supported in the case of the photopolymerization as well as the thermal polymerization that the alternating copolymer having substantially the composition of butadiene unit and acrylonitrile unit of 1:1 (molar ratio) was obtained regardless of the amount of acrylonitrile fed. The comparison of the photopolymerization curve with the thermal copolymerization curve is shown in FIG. 4.

Example 14

A hard glass reaction tube of 30 ml. capacity and 1 mm. thickness was thoroughly dried and air in the reaction tube was replaced with gaseous nitrogen. Into the reaction tube were charged 304 mmoles of purified acrylonitrile and a 1 mole/l. solution of 2.1 mmoles of sublimed and purified aluminum tribromide in cyclohexane and mixed at room temperature. Then, the resulting mixture was cooled to −78° C. and added with 53 mmoles of butadiene. The reaction system was a slightly light yellowish homogeneous and transparent solution. Then, the reaction tube was exposed to a light of 3,500 A. by means of a high pressure mercury lamp at a distance of 3 cm. at room temperature for 10 hours. After exposed for 10 hours, the reaction system was solidified as being homogeneous and transparent. The reaction system was diluted with the addition of a small amount of methanol as a polymerization inhibitor and a very small amount of N-phenyl-$\beta$-naphthylamine as an antioxidant and further dichloromethane as a solvent. The diluted solution was dropwise added in boiling water to evaporate the unreacted monomers and the solvent and to solute aluminum tribromide, whereby a polymer was separated off and purified. Such a treatment was repeated several times and the resulting copolymer was dried under vacuum.

The obtained copolymer was a rubbery elastomer and the conversion was 63% based on the theoretical conversion assumed that only an alternating copolymer is obtained.

The intrinsic viscosity of the copolymer measured in dimethylformamide at 30° C. was 1.6.

The copolymer was dissolved in deuterochloroform and NMR spectrum of the copolymer was measured at 60 megacycles. As a control, NMR spectrum was measured with respect to a random copolymer having an acrylonitrile content of about 50 mole percent under the same conditions. As a result, it was confirmed that the composition of the copolymer can be determined from the ratio of the area of NMR spectrum of the methine proton in butadiene unit to the area of NMR spectrum of the methine proton of acrylonitrile unit and the methylene proton of acrylonitrile unit and butadiene unit. In this way, the composition of the resulting copolymer was identified.

As a result, it was found that the content of acrylonitrile unit was 50.9 mole percent, that is, the resulting copolymer was composed of the same mole amount of butadiene unit and acrylonitrile unit and the composition was 1:1. Furthermore, it was found that the copolymer contained neither homopolymer nor block polymer by checking chemical shifts and had a high alternation and a good stereospecific property from the simplicity and the sharpness of NMR spectrum.

Moreover, the copolymer was dissolved in tetrahydrofuran and formed into a film on a rock salt plate, and the IR spectrum of the copolymer was measured. As a result, the characteristic absorption band of nitrile group in the acrylonitrile unit and that of trans-1,4-bond in the butadiene unit were observed apparently at 2,240 cm.$^{-1}$ and 970 cm.$^{-1}$, respectively. The characteristic absorption band of 1,2-bond in the butadiene unit was negligible and that of cis-1,4-bond was not substantially observed. The microstructure value measured by Morero's method was 98.0% of trans-1,4-bond, 2.0% of 1,2-bond and 0% of cis-1,4-bond. According to the elemental analysis of the resulting copolymer, found value of carbon was 78.87%, that of hydrogen 8.56%, and that of nitrogen 12.90%, so that the found values well agreed with the theoretical values (carbon: 78.47%, hydrogen: 8.46%, nitrogen: 13.07%) of an alternating copolymer having the composition of 1:1.

As described above, it was found that the resulting copolymer was a stereospecific alternating copolymer, wherein butadiene units were substantially bonded in trans-1,4-type.

Example 15

A copolymerization of butadiene and acrylonitrile was effected in the same manner as described in Example 14, except that anhydrous aluminum trichloride was used instead of aluminum tribromide, to obtain a rubbery copolymer in a conversion of 60%. It was confirmed from NMR spectrum and IR spectrum that the copolymer was an alternating copolymer.

Example 16

A photopolymerization was effected in the same manner as described in Example 15, except that aluminum trichloride-acetonitrile complex was used instead of anhydrous aluminum trichloride, to obtain a rubbery elastomer in a conversion of 55%. It was confirmed from NMR spectrum and IR spectrum that the elastomer was an alternating copolymer.

Example 17

A photopolymerization was effected in the same manner as described in Example 14, except that aluminum tribromide-ethyl benzoate complex was used instead of anhydrous aluminum trichloride and the polymerization time was 2.5 hours, to obtain a rubbery elastomer in a conversion of 29%. It was confirmed from NMR spectrum and IR spectrum that the elastomer was an alternating copolymer.

Example 18

A copolymerization of butadiene and acrylonitrile was effected in the same manner as described in Example 14, except that 0.21 mmole of p-cymene was further added. After polymerized for 20 hours, a rubbery elastomer was obtained in a conversion of 94%. It was confirmed from NMR spectrum and IR spectrum that the elastomer was an alternating copolymer.

Example 19

A copolymerization of isoprene and acrylonitrile was effected in the same manner as described in Example 15 to obtain a solid copolymer in a conversion of 50%. According to the elemental analysis, found value of nitrogen was 11.25%, so that this value well agreed with the theoretical value of 11.56% in an alternating copolymer having a composition of 1:1.

Example 20

A photopolymerization was effected in the same manner as described in Example 14, except that 53 mmoles of methyl methacrylate and 106 mmoles of butadiene were charged, to obtain an elastomeric resinous product in a conversion of 30%. According to the elemental analysis, found value of oxygen was 20.60%, that of carbon 70.31% and that of hydrogen 9.37%, so that these values well agreed with the theoretical values (oxygen: 20.74%, carbon: 70.13%, hydrogen: 9.15%) of an alternating copolymer having a composition of 1:1.

Example 21

A photopolymerization was effected in the same manner as described in Example 19, except that 250 mmoles of acrylonitrile and 53 mmoles of isoprene were charged, to obtain a copolymer in a conversion of 61%. It was confirmed from elemental analysis that the copolymer was an alternating copolymer having a composition of 1:1.

Example 22

A copolymerization of pentadiene and acrylonitrile was effected in the same manner as described in Example 15, to obtain a solid polymer in a conversion of 15%. It was found from IR spectrum that pentadiene units were substantially bonded in trans-1,4-type. It was confirmed from elemental analysis that the polymer had a composition of 1:1.

Example 23

529 mmoles of distilled and purified acrylonitrile was cooled to −78° C. and added with a 2 mole/l. solution of 2 mmoles of anhydrous aluminum trichloride in acrylonitrile. Then, 100 mmoles of butadiene was added and finally a 0.2 mole/l. solution of 1 mmole of naphthalene in n-hexane was added, after which a photopolymerization was effected in the same manned as described in Example 14 for 2 hours. The conversion of the resulting copolymer was 26.1%. On the other hand, when the photocopolymerization was effected without adding naphthalene under the same condtion as described above, the conversion was 9.3%.

Example 24

A copolymerization of butadiene and acrylonitrile was effected in the same manner as described in Example 14, except that 2.12 mmoles of aluminum trichloride was used instead of aluminum tribromide and 1.06 mmoles of xanthone was added. After polymerized for 20 hours, a hard rubbery alternating copolymer was obtained in a conversion of 30.0%.

Example 25

(1) A hard glass reaction tube of 30 ml. capacity and 1 mm. thickness was dried and air in the reaction tube was replaced with gaseous nitrogen. Into the reaction tube was charged 304 mmoles of purified and dehydrated acrylonitrile, cooled to −78° C. and charged an acrylonitrile solution of 2.12 mmoles of aluminum trichloride and further 53 mmoles of purified and dehydrated liquid butadiene. The reaction tube was fused and sealed, and then exposed at room temperature to an ultraviolet ray by means of a high pressure mercury lamp of 300 w. at a distance of about 4 cm. After exposed for 25 minutes, it was confirmed that the reaction system was to become viscous. Then, the reaction tube was left to stand in a dark room at room temperature for 30 days. Thereafter, the reaction tube was opened and added with a small amount of N-phenyl-β-naphthylamine and the reaction mass was poured into a large amount of methanol. However, methanol became only muddy in white and the polymer was not separated off. It was assumed from such a phenomenon that a very small amount of polymer was produced.

(2) A photopolymerization was effected for 4 hours and 35 minutes in the same manner as described above, except that the amount of aluminum trichloride added was 0.21 mmole and the dark reaction was not effected. A rubbery alternating copolymer was obtained in a conversion of 10%.

It was confirmed from elemental analysis that the acrylonitrile content of the polymer was 51.0 mole percent. The gel content was about 10%. The intrinsic viscosity of the copolymer measured in dimethylformamide at 30° C. was 4.00.

Example 26

A photopolymerization was effected at 30° C. for 15 minutes while irradiating an ultraviolet ray in the same manner as described in Example 25, except that 304 mmoles of acrylonitrile, 2.12 mmoles of aluminum trichloride, 0.11 mmole of vanadyl chloride and 53 mmoles of butadiene were charged under nitrogen atmosphere. A rubbery alternating copolymer was obtained in a conversion of 7%. The intrinsic viscosity was 1.00.

Example 27

A photopolymerization was effected for 4 hours in the same manner as described in Example 26 to obtain a rubbery alternating copolymer in a conversion of 22%. The intrinsic viscosity was 1.15.

Example 28

A photopolymerization was effected at room temperature for 15.5 hours while irradiating an ultraviolet ray in the same manner as described in Example 26, except that 304 mmoles of acrylonitrile, 0.011 mmole of aluminum trichloride, 0.0053 mmole of vanadyl chloride and 53 mmoles of butadiene were charged, to obtain a rubbery alternating copolymer containing no gel in a conversion of 8%. The amount of the copolymer produced per the amount of the catalyst was 810 times. The intrinsic viscosity of the copolymer measured in dimethylformamide at 30° C. was 1.48. (When the photopolymerization was effected under the same conditions as described above without adding vanadyl chloride, the conversion was 8.5%, the gel content was 12% and the intrinsic viscosity was 4.00.) The similar results were obtained when vanadium acetylacetonate, chromyl chloride, manganese acetylacetonate and iron acetylacetonate were used instead of vanadyl chloride.

Example 29

A photopolymerization was effected at room temperature for 48 hours while irradiating ultraviolet ray in the same manner as described in Example 25, except that 200 mmoles of acrylonitrile, 2.12 mmoles of aluminum tribromide, 0.11 mmole of vanadyl chloride and 150 mmoles of butadiene were charged, to obtain a rubbery alternating copolymer in a conversion of 40%. The gel content was about 10% and the intrinsic viscosity was 1.00. (When the photopolymerization was effected without adding vanadyl chloride under the same conditions as described above, an alternating copolymer having a gel content of 55% was obtained in a conversion of 22% for a polymerization time of 5 hours, and furthermore an alternating copolymer having a gel content of 80% was obtained in a conversion of 63% for a polymerization time of 11.5 hours.)

The similar results were obtained when hexane, toluene, monochlorobenzene and dichloromethane were used as a solvent.

Example 30

A photopolymerization was effected at room temperature for 24 hours while irradiating an ultraviolet ray in the same manner as described in Example 25, except that 300 mmoles of methyl methacrylate, 1.00 mmole of aluminum trichloride, 0.2 mmole of vanadyl butoxide and 60 mmoles of isoprene were charged, to obtain a rigid and solid alternating copolymer having no gel content in a conversion of 27%. The intrinsic viscosity of the copolymer measured in toluene at 30° C. was 1.12. It was confirmed from elemental analysis that the content of methyl methacrylate in the polymer was 51.0 mole percent.

The similar results were obtained when methyl acrylate and butyl acrylate were used instead of methyl methacrylate.

Example 31

A photopolymerization was effected at 30° C. for 20 hours while irradiating an ultraviolet ray in the same manner as described in Example 25, except that 100 mmoles of methyl methacrylate, 2.1 mmoles of aluminum trichloride, 0.11 mmole of vanadyl chloride, 100 mmoles of butadiene and 100 mmoles of styrene were charged, to obtain a resinous multi-component alternating copolymer in a conversion of 10%. It was confirmed from elemental analysis that the composition of the copolymer had 47 mole percent of methyl methacrylate, 36 mole percent of butadiene and 17 mole percent of styrene and the molar ratio of electron donor monomer (butadiene and styrene) and electron acceptor monomer (methylmethacrylate) was 1:1.

Moreover, the composition anticipated in the case of free radical reaction had 34 mole percent, 49 mole percent and 17 mole percent, respectively, so that these values were entirely different from the above described values.

Example 32

A photopolymerization was effected at 30° C. for 20 hours while irradiating an ultraviolet ray in the same manner as described in Example 31, except that 50 mmoles of methyl methacrylate, 200 mmoles of butadiene and 100 mmoles of styrene were charged, to obtain a resinous multi-component alternating copolymer in a conversion of 13%. It was confirmed from elemental analysis that the composition of the copolymer had 49 mole percent of methyl methacrylate, 40 mole percent of butadiene and 12 mole percent of styrene and the molar ratio of electron donor monomer and electron acceptor monomer was 1:1.

Example 33

A photopolymerization was effected in the same manner as described in Example 28, except that cobalt triacetylacetonate was used instead of vanadyl chloride, to obtain a rubbery alternating copolymer having no gel content in a conversion of 8%. The amount of the copolymer produced per the amount of the catalyst was 100 times. The intrinsic viscosity was 2.73.

Example 34

Into a hard glass reaction tube of about 30 ml. capacity and 1 mm. thickness were charged 304 mmoles of acrylonitrile and an acrylonitrile solution of 2.12 mmoles of zinc chloride under nitrogen atmosphere and further charged 53 mmoles of butadiene at −78° C. After the reaction tube was fused and sealed, the reaction tube was exposed to an ultraviolet ray by means of a high pressure mercury lamp of 300 w. at a distance of about 4 cm. at room temperature. After exposed for 48 hours, the reaction mass was added with a small amount of N-phenyl-β-naphthylamine as an antioxidant and poured into a large amount of methanol to precipitate a copolymer. A rubbery alternating copolymer was obtained in a conversion of 26%. It was confirmed from elemental analysis that the acrylonitrile content of the copolymer was 52 mole percent. The intrinsic viscosity of the copolymer measured in dimethylformamide at 30° C. was 3.1. The gel content was 10%.

Example 35

A photopolymerization was effected in the same manner as described in Example 34, except that zinc bromide was used instead of zinc chloride and the reaction time was 24 hours, to obtain a rubbery alternating copolymer in a conversion of 100%. The gel content was 80%.

Example 36

A photopolymerization was effected for 15 hours while irradiating an ultraviolet ray in the same manner as described in Example 34, except that 200 mmoles of acrylonitrile, 0.011 mmole of zinc chloride and 100 mmoles of butadiene were charged, to obtain a rubbery alternating copolymer in a conversion of 10%. The amount of the copolymer produced per 1 mole of zinc chloride was 960 moles on the monomer unit. The gel content was 10%. The intrinsic viscosity of the soluble part was 7.6. It was found from elemental analysis that the acrylonitrile content was 52 mole percent. (The similar result was obtained when tetrachloromethane was used as a solvent.)

Example 37

A photopolymerization was effected in the same manner as described in Example 36, except that isoprene and methyl methacrylate were used instead of butadiene and acrylonitrile, respectively, to obtain a resinous alternating copolymer in a conversion of 15%. The gel content was 8%. The intrinsic viscosity of the soluble part was 2.8. It was confirmed from elemental analysis that the content of methyl methacrylate in the copolymer was 50 mole percent. (The similar result was obtained when methyl acrylate was used instead of methyl methacrylate.)

Example 38

A photopolymerization was effected in the same manner as described in Example 36, except that 0.0053 mmole of vanadyl chloride was further added, to obtain a rubbery alternating copolymer in a conversion of 17%. The amount of the copolymer produced per 1 mole of zinc chloride was 1110 moles on the monomer unit. The gel content was 2%. The intrinsic viscosity of the soluble part was 5.2. It was confirmed from elemental analysis that the acrylonitrile content of the copolymer was 53 mole percent.

Example 39

A photopolymerization was effected in the same manner as described in Example 38, except that cobalt triacetylacetonate was used instead of vanadyl chloride, to obtain a rubbery alternating copolymer in a conversion of 12%. The gel content was 1%. The intrinsic viscosity of the soluble part was 4.4.

Example 40

A photopolymerization was effected in the same manner as described in Example 38, except that chromyl chloride, methyl acrylate and isoprene were used instead of vanadyl chloride, acrylonitrile and butadiene, respectively, to obtain an elastomeric resinous alternating copolymer in a conversion of 10%. The gel content was 1%.

Example 41

A photopolymerization was effected in the same manner as described in Example 38, except that iron triacetylacetonate was used instead of vanadyl chloride, to obtain a rubbery alternating copolymer in a conversion of 8%. The gel content was 1%.

Example 42

A photopolymerization was effected at 30° C. for 48 hours while irradiating an ultraviolet ray in the same manner as described in Example 34, except that 100 mmoles of methyl methacrylate, 0.011 mmole of zinc bromide, 0.0053 mmole of vanadyl chloride, 100 mmoles of butadiene and 100 mmoles of styrene were charged, to obtain a resinous alternating copolymer in a conversion of 10%. It was confirmed from elemental analysis that the molar ratio of methyl methacrylate:butadiene:styrene in the copolymer was 47:36:17 and the copolymer was a multi-component alternating copolymer consisting of electron acceptor monomer and electron donor monomer.

Example 43

A photopolymerization was effected in the same manner as described in Example 14, except that the complex of aluminum tribromide with N,N-dimethylaniline was used as a catalyst instead of aluminum tribromide, and 449 mmoles of acrylonitrile, 2.0 mmoles of aluminum tribromide-N,N-dimethylaniline complex and 100 mmoles of butadiene were charged into a bottle in this order. After the irradiation of an ultraviolet ray by means of a high pressure mercury lamp of 1,200 w. for 3 hours, there was obtained an elastomer in a conversion of 58.4%.

What is claimed is:

1. A method of producing alternating copolymers of conjugated diene and conjugated polar vinyl monomers, wherein the molar ratio of the conjugated diene units to the conjugated polar vinyl monomer units is always 1:1, comprising irradiating a light having a wave length of 2,000–6,000 angstroms to a polymerization reaction system com- posed of at least one conjugated diene having the general formula wherein $R^1$, $R^2$, $R^3$ and $R^4$ represent hydrogen atoms, hydrocarbon radicals having 1 to 5 carbon atoms or hydrocarbon radicals having substituents of these radicals, and at least one conjugated polar vinyl monomer having the general formula wherein $R^7$ represents a hydrogen atom, a hydrocarbon radical having 1 to 10 carbon atoms or a hydrocarbon radical having substituents of the radical, Z represents a nitrile group or an ester group having the general formula wherein $R^8$ represents a hydrocarbon radical having 1 to 10 carbon atoms, the molar ratio of said conjugated diene to said polar vinyl monomer being 1:20 to 20:1, at a temperature of $-100-+100°$ C., in liquid state, in the presence of at least one catalytic component selected from the group consisting of metal halides having the general formulae $$ZnX_2 \text{ and } AlX_3$$

wherein X represents a halogen atom, the amount of said catalytic component being in the range of $1/10^6$ to $1/2$ mole per 1 mole of the total fed monomer.

2. A method according to claim 1, wherein said conjugated diene is butadiene.

3. A method according to claim 1, wherein said conjugated diene is isoprene.

4. A method according to claim 1, wherein said conjugated diene is pentadiene.

5. A method according to claim 1, wherein said polar vinyl monomer is acrylonitrile.

6. A method according to claim 1, wherein said polar vinyl monomer is selected from the group consisting of methyl methacrylate and methyl acrylate.

7. A method according to claim 1, wherein the combination of monomers is butadiene/acrylonitrile.

8. A method according to claim 1, wherein the combination of monomers is isoprene/acrylonitrile.

9. A method according to claim 1, wherein the combination of monomers is pentadiene/acrylonitrile.

10. A method according to claim 1, wherein the combination of monomers is butadiene/methyl methacrylate.

11. A method according to claim 1, wherein the combination of monomers is isoprene/methyl methacrylate.

12. A method according to claim 1, wherein the combination of monomers is isoprene/methyl acrylate.

13. A method according to claim 1, wherein said catalytic component is aluminum trichloride.

14. A method according to claim 1, wherein said catalytic component is aluminum tribromide.

15. A method according to claim 1, wherein said catalytic component is zinc chloride.

16. A method according to claim 1, wherein said catalytic component is zinc bromide.

References Cited

FOREIGN PATENTS 1,487,211   5/1967   France.

OTHER REFERENCES

Furukawa et al.: Novel Synthetic Rubber by Alternating Copolymerization, Translation of Symposium of Japanese Chemical Fiber Institute, pp. 83–98, October 1968.

Furukawa et al.: Alternating Copolymerization of Butadiene-1-3 with Acrylonitrile, Bull. Inst. Chem. Res., Kyoto Univ., Vol. 47, No. 3, pp. 222–238, May, 1969.

Hirooka et al.: Complex Copolymerization I, Novel Equimolar Copolymers of Acrylonitrile and Olefins, Polymer Letters, J. of Polymer Science, Vol. 5, pp. 47–55, 1967.

MURRAY TILLMAN, Primary Examiner

R. B. TURER, Assistant Examiner

U.S. Cl. X.R.

204—159.22, 159.23, 23.7 N, 23.7 M, 41.5 R, 80.7, 82.3, 82.5, 83.1, 85.5